United States Patent
Lee (10) Patent No.: US 10,564,516 B2
(45) Date of Patent: Feb. 18, 2020

(54) IRIS MODULE AND CAMERA MODULE INCLUDING THE SAME

(71) Applicant: Samsung Electro-Mechanics Co., Ltd., Suwon-si (KR)

(72) Inventor: Kyung Hun Lee, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 16/196,244

(22) Filed: Nov. 20, 2018

(65) Prior Publication Data

US 2019/0377239 A1 Dec. 12, 2019

(30) Foreign Application Priority Data

Jun. 8, 2018 (KR) .................. 10-2018-0065791

(51) Int. Cl.
*G03B 9/06* (2006.01)

(52) U.S. Cl.
CPC .................. *G03B 9/06* (2013.01)

(58) Field of Classification Search
USPC .................. 396/505–510
See application file for complete search history.

(56) References Cited

U.S. PATENT DOCUMENTS

| 8,497,479 B1* | 7/2013 | Garman | G01J 5/06 |
| | | | 250/352 |
| 2018/0039158 A1* | 2/2018 | Shikama | G03B 9/02 |

FOREIGN PATENT DOCUMENTS

| KR | 10-0881726 B1 | 2/2009 |
| KR | 10-1635783 B1 | 7/2016 |
| KR | 10-2017-0123615 A | 11/2017 |

* cited by examiner

*Primary Examiner* — Clayton E. LaBalle
*Assistant Examiner* — Warren K Fenwick
(74) *Attorney, Agent, or Firm* — NSIP Law (57) ABSTRACT

An iris module and a camera module including the iris module. The iris module includes a base including a yoke, blades disposed on an object side of the base, and a driving magnet movable in a direction perpendicular to an optical axis direction, and disposed to oppose the yoke. The yoke includes holding portions on both ends of the yoke, and the holding portions protrude in a direction of the driving magnet.

16 Claims, 8 Drawing Sheets

IRIS MODULE AND CAMERA MODULE INCLUDING THE SAME

CROSS-REFERENCE TO RELATED APPLICATION

This application claims the benefit under 35 USC 119(a) to Korean Patent Application No. 10-2018-0065791 filed on Jun. 8, 2018 in the Korean Intellectual Property Office, the entire disclosure of which is incorporated herein by reference for all purposes.

BACKGROUND

1. Field

The following description relates to an iris module and a camera module including the same.

2. Description of Related Art

Recently, a camera module has been basically installed in portable electronic devices such as smartphones, tablet PCs, laptop computers, and the like. A typical digital camera is equipped with a mechanical iris to change an amount of incident light therein, depending on a photography environment. However, since a camera module used in a small product such as a portable electronic device has structural features and spatial limitations, it is difficult for the camera module to be equipped with a separate iris.

Since various components configured to drive an iris cause a camera module to increase in weight, an autofocusing function may be degraded. In addition, when an iris includes a power connector itself such as a coil configured to drive the iris or the like, the power connector may be locked according to vertical movement of a lens during autofocusing.

Furthermore, since an iris module having various apertures should be mounted in a narrow space, a position of a driver cannot be accurately fixed. Accordingly, an accurate aperture cannot be realized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an iris module includes a base including a yoke, blades disposed on an object side of the base, and a driving magnet movable in a direction perpendicular to an optical axis direction, and disposed to oppose the yoke. The yoke includes holding portions on both ends of the yoke, and the holding portions protrude in a direction of the driving magnet.

The yoke may have a length greater than a length of the driving magnet.

At least a portion of each of the holding portions may face a side surface of the driving magnet.

The yoke may cross a middle portion of the driving magnet in the optical axis direction, and a middle portion of the yoke may have a diameter smaller than a diameter of the other portions of the yoke.

The yoke may cross a middle portion of the driving magnet in the optical axis direction, the yoke may include first extensions on both ends of the yoke, and the first extensions may protrude in the optical axis direction.

Each of the first extensions may extend beyond a lower end of the driving magnet, each of the first extensions may include a second extension disposed on an end of the first extension, and the second extensions may protrude to face a bottom surface of the driving magnet.

The base may include a projection extending in the optical axis direction.

The magnet may be moveably provided on the projection.

The holding portions may be molded into the projection.

The holding portions may be exposed outwardly of the projection in the direction perpendicular to the optical axis direction.

The base may be coupled to an object side of a lens module.

In another general aspect, a camera module includes a lens module, a housing to accommodate the lens module, and an iris module coupled to an object side of the lens module. The iris module includes a base fixed to an object side portion of the lens module, the base extending outwardly of the lens module in an optical axis direction, blades disposed on the object side of the lens module to form one or more apertures to change an intensity of light incident on the lens module, a magnet unit including a driving magnet, the magnet unit being movable in a direction perpendicular to the optical axis direction, and a projection including a yoke disposed to oppose the driving magnet. The yoke includes holding portions on both ends of the yoke, and the holding portions extend in a direction of the driving magnet. The housing includes a coil to react with the magnet to drive the iris module.

The magnet unit may include a projection to penetrate a guide hole in each of the blades.

The base may include a projection to be inserted into a guide hole in each of the blades, and the blades may form the one or more apertures by rotationally moving about the projection as an axis.

The base may include a rod member, the magnet unit may include an insertion groove, and the rod member may be inserted into the insertion groove to move the magnet unit in the direction perpendicular to the optical axis direction.

The blades may include a first blade and a second blade that at least partially overlaps the first blade in the optical axis direction, the first blade may include a first through hole, the second blade may include a second through hole, and the first blade and the second blade may rotate in opposite directions about a common axis to form the one or more apertures.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
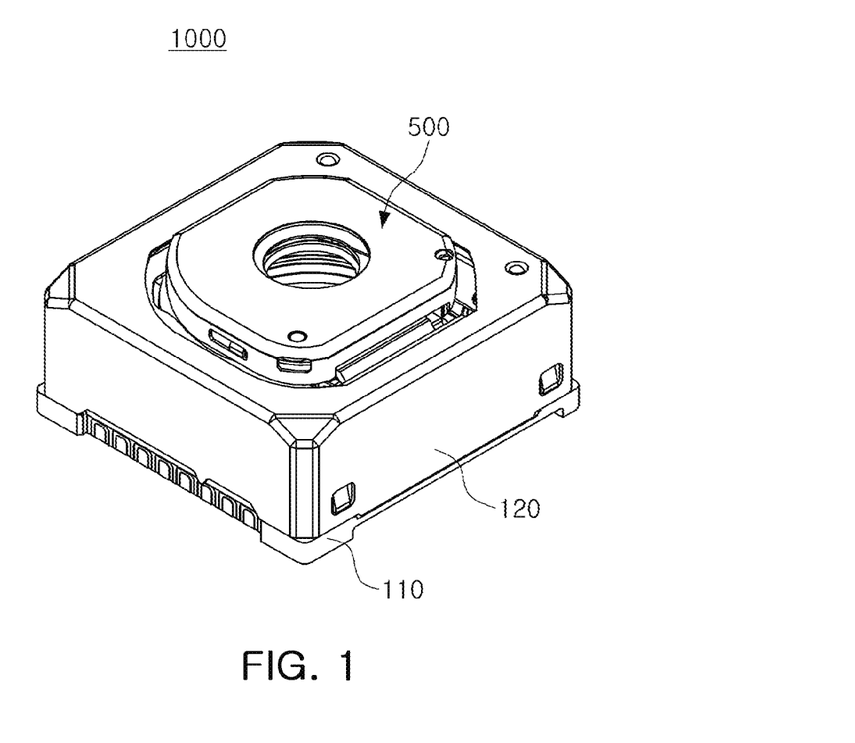
FIG. 1 is a perspective view of a camera module according to an example.
Figure 2:
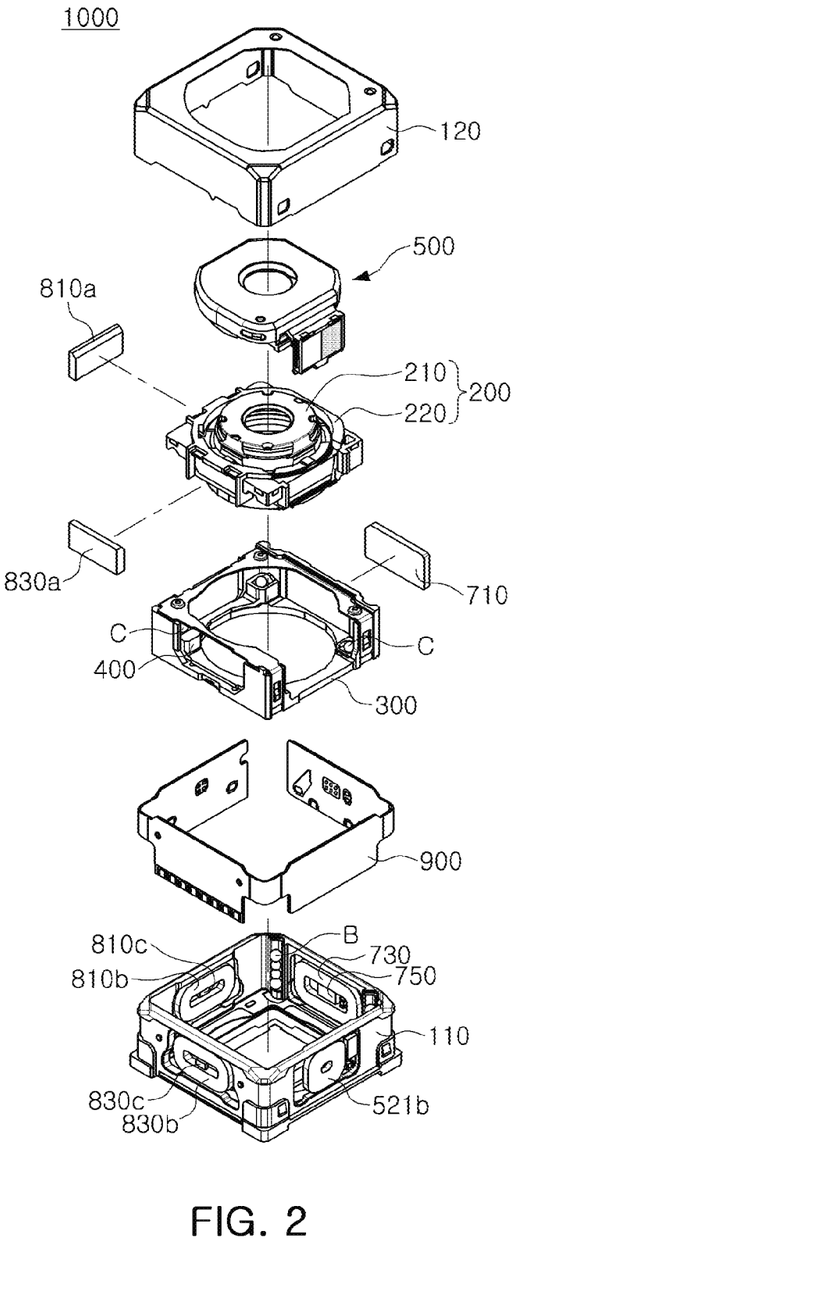
FIG. 2 is an exploded perspective view of a camera module according to an example.

FIG. 1 is a perspective view of a camera module according to an example. FIG. 2 is an exploded perspective view of a camera module according to an example, and FIG. 3 is a perspective view of a portion of a camera module according to an example.

Figure 3:
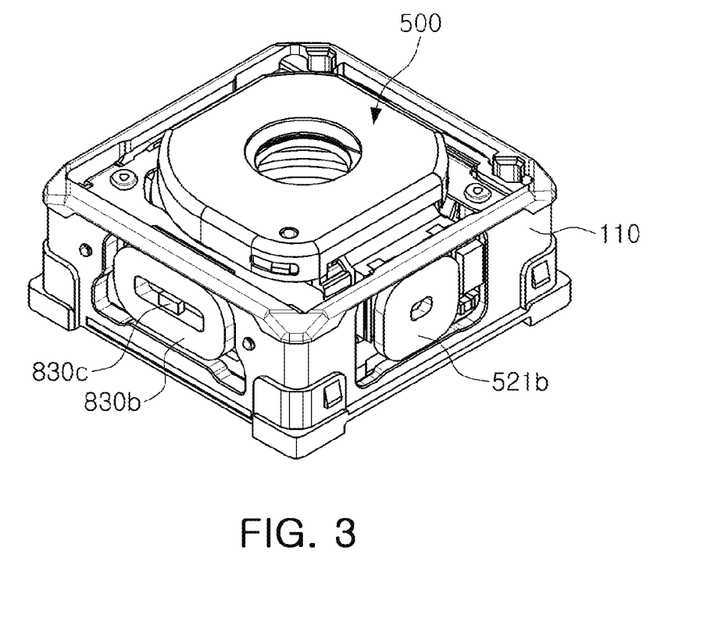
FIG. 3 is a partial perspective view of a camera module according to an example.

Referring to FIGS. 1 to 3, a camera module 1000 includes a lens module 200, a carrier 300, a guide unit 400, an iris module 500, a housing 110, and a case 120.

The lens module 200 may include a lens barrel 210 including a plurality of lenses configured to capture a subject and a holder 220 configured to hold the lens barrel 210. The plurality of lenses is disposed inside the lens barrel 210. The lens module 200 is accommodated in the carrier 300.

The lens module 200 is configured to be movable in an optical axis direction to perform autofocusing. As an example, the lens module 200 may be moved with the carrier 300 in the optical axis direction by an autofocusing unit.

The autofocusing unit includes a magnet 710 configured to generate driving force in the optical axis direction and a coil 730. The autofocusing unit may further include a position sensor 750, for example, an aperture sensor configured to sense an optical axis direction position of the lens module 200, and the carrier 300.

The magnet 710 is mounted on the carrier 300. As an example, the magnet 710 may be mounted on one surface of the carrier 300.

The coil 730 and the position sensor 750 are mounted in the housing 110. As an example, the coil 730 and the position sensor 750 may be fixed to the housing 110 to face the magnet 710. The coil 730 and the position sensor 750 may be provided on a board 900, and the board 900 may be mounted on the housing 110.

The magnet 710 is a movable member mounted on the carrier 300 to move with the carrier 300 in the optical axis direction, and the coil 730 and the position sensor 750 are fixed members fixed to the housing 110.

When the coil 730 is supplied with power, the carrier 300 may be moved in the optical axis direction by electromagnetic influence and the position sensor 750 may sense an optical axis direction position of the carrier 300.

Since the lens module 200 is accommodated in the carrier 300, the lens module 200 may be moved with the carrier 300 in the optical axis direction by the movement of the carrier 300.

A rolling member B is disposed between the carrier 300 and the housing 110 to reduce friction force between the carrier 300 and the housing 110 when the carrier 300 is moved. The rolling member B may be in the form of a ball.

The rolling member B is disposed on both sides of the magnet 710 (or the coil 730).

A yoke may be mounted on the board 900. As an example, the yoke may be provided to face the magnet 710 with the coil 730 interposed between the yoke and the magnet 710.

Attractive force acts between the yoke and the magnet 710 in a direction perpendicular to the optical axis direction.

The rolling member B may be maintained in a state of contact with the carrier 300 and the housing 110 by the attractive force between the yoke and the magnet 710.

The yoke serves to focus magnetic force of the magnet 710. Thus, generation of leakage flux may be prevented.

As an example, the yoke and the magnet 710 constitute a magnetic circuit.

The lens module 200 may be moved in a first direction perpendicular to an optical axis and a second direction perpendicular to the optical axis and perpendicular to the first direction to correct image blurring caused by user hand-shake or the like.

For example, a shake correction unit compensates for shake caused by user hand-shake when an image is captured, by applying a relative displacement corresponding to the shake to the lens module 200.

A guide unit 400 is accommodated in the carrier 300 to be disposed in a location in the optical axis direction. The holder 220 is placed on the guide unit 400. Ball members C may be provided, to serve as rolling bearings, between the carrier 300 and the guide unit 400 in the optical axis direction and between the guide unit 400 and the holder 220 in the optical axis direction.

The guide unit 400 is configured to guide the lens module 200 when the lens module 200 is moved in the first direction and moved in the second direction perpendicular to the optical axis.

As an example, the lens module 200 may be configured to move relative to the guide unit 400 in the first direction and the guide unit 400 and the lens module 200 are configured to move together within the carrier 300 in the second direction.

The shake correction unit includes a plurality of magnets 810a and 830a configured to generate driving force for shake correction and a plurality of coils 810b and 830b, which are optical image stabilization (01S) driving coils. The shake correction unit may further include a plurality of position sensors 810c and 830c, for example, hole sensors to sense positions in the first and second directions of the lens module 200.

Among the magnets 810a and 830a and the coils 810b and 830b, one magnet 810a and one coil 810b are disposed to face each other in the first direction to generate driving force in the first direction, and the other magnet 830a and the other coil 830b are disposed to face each other in the second direction to generate driving force in the second direction.

The magnets 810a and 830a are mounted on the lens module 200, and the coils 810b and 830b and the position sensors 810c and 830c, which are disposed to face the magnets 810a and 830a, are fixed to the housing 110. As an example, the coils 810b and 830b and the position sensors 810c and 830c are provided on the board 900, and the board 900 is mounted on the housing 110.

The magnets 810a and 830a are movable members moving with the lens module 200 in the first and second directions, and the coils 810b and 830b and the position sensors 810c and 830c are fixed members fixed to the housing 110.

A ball member C is provided to support the guide unit 400 and the lens module 200. The ball member C serves to guide the guide unit 400 and the lens module 200 during shake correction.

The ball member C may be provided between the carrier 300 and the guide unit 400, between the carrier 300 and the lens module 200, and between the guide unit 400 and the lens module 200.

When driving force is generated in the first direction, the ball members C disposed between the carrier 300 and the guide unit 400 and between the carrier 300 and the lens module 200 make a rolling motion in the first direction. Accordingly, the ball member C guides movements of the guide unit 400 and the lens module 200 in the first direction.

When driving force is generated in the second direction, the ball members C disposed between the guide unit 400 and the lens module 200 and between the carrier 300 and the lens module 200 make a rolling motion in the second direction. Accordingly, the ball member C guides the movement of the lens module 200 in the second direction.

The lens module 200 and the carrier 300 are accommodated in the housing 110. As an example, the housing has an open top and an open bottom, and the lens module 200 and the carrier 300 are accommodated in an internal space of the housing 110.

A printed circuit board (PCB) with an image sensor mounted thereon may be disposed below the housing 110.

The case 120 is coupled to the housing 110 to cover an external surface of the housing 110 and serves to protect internal components of a camera module 1000. The case 120 serves to shield electromagnetic waves.

As an example, the case 120 may shield electromagnetic waves generated in the camera module 1000 to prevent the electromagnetic waves from affecting other electronic components inside a portable electronic device.

Since not only the camera module, but also other various electronic components are mounted in a portable electronic device, the case 120 may shield electromagnetic waves generated in such electronic components to prevent the electromagnetic waves from affecting the camera module 1000.

The case 120 may be formed of a metal to be grounded to a ground pad provided on the PCB. Thus, the case 120 may shield the electromagnetic waves.

The iris module 500 is a device configured to selectively change the amount of light incident on the lens module 200.

As an example, the iris module 500 may be provided with a plurality of apertures having different sizes from each other. According to a photography environment, light may be incident through one of the plurality of apertures.

Figure 4:
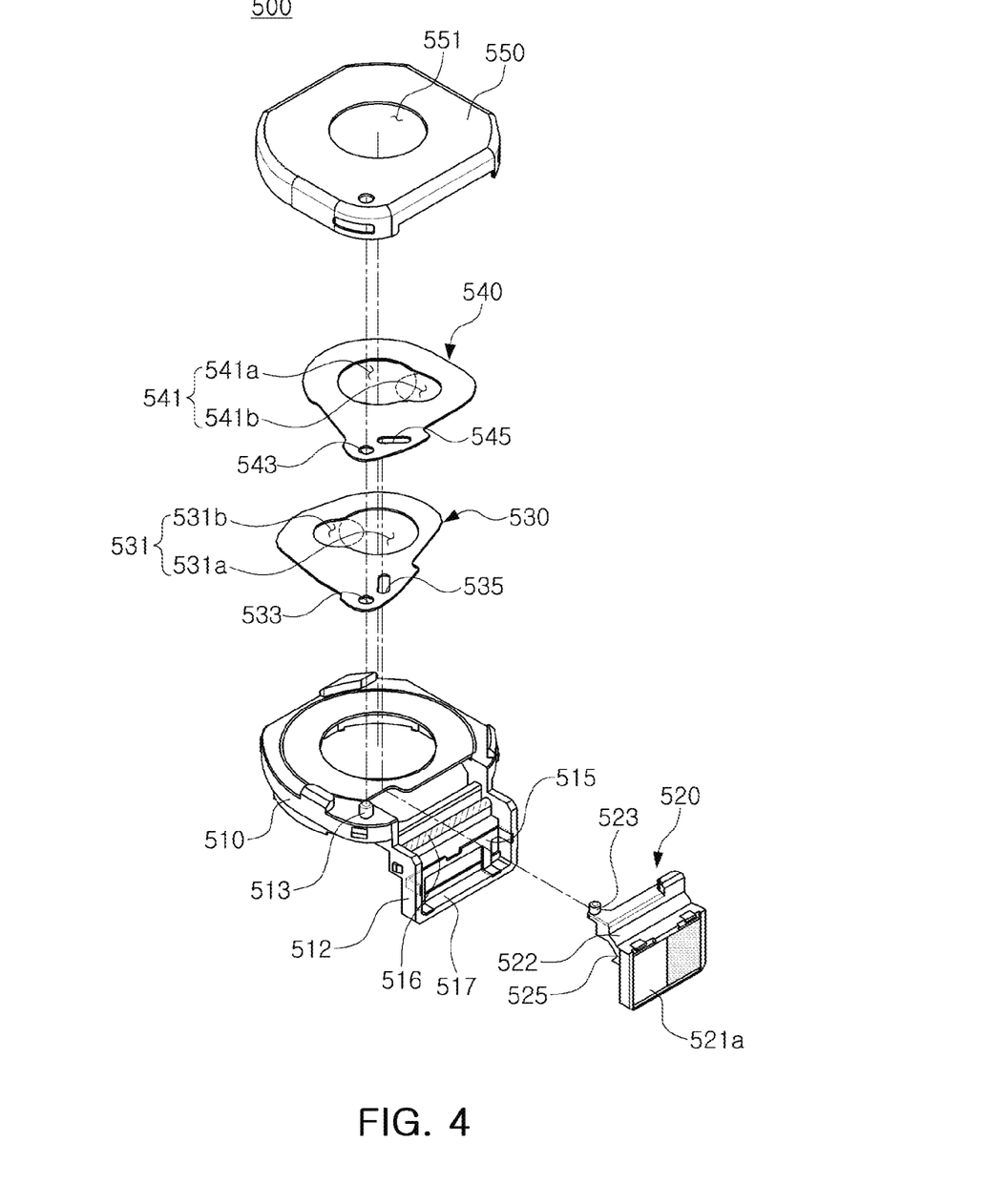
FIG. 4 is an exploded perspective view of an iris module according to an example.
Figure 5A:
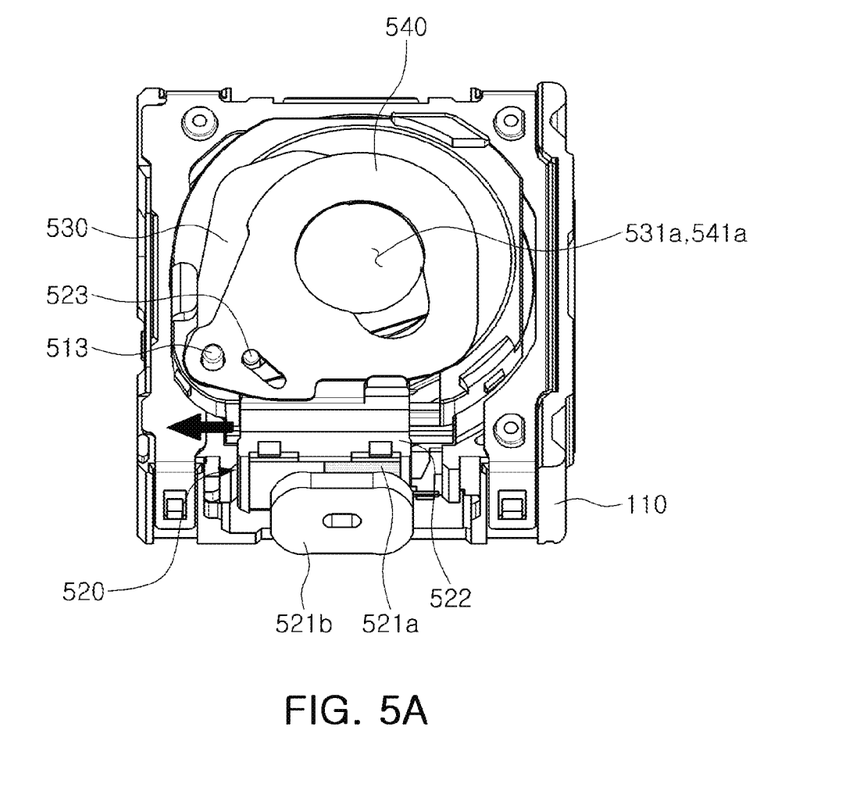
FIGS. 5A and 5B are plan views illustrating that an iris module is driven to change a diameter of an aperture.
Figure 5B:
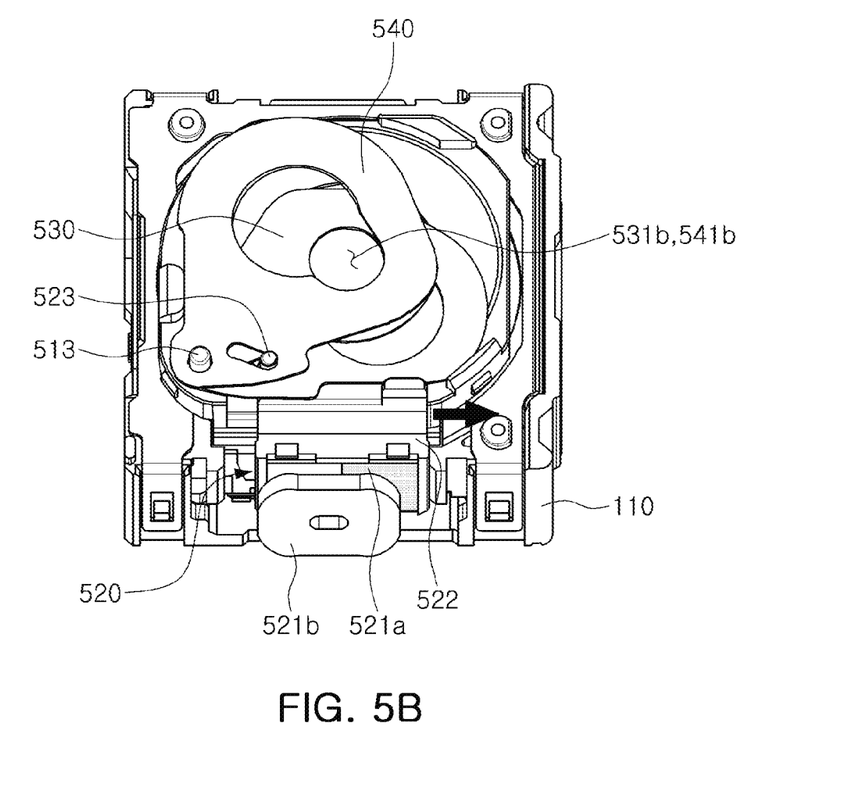
Figure 6:
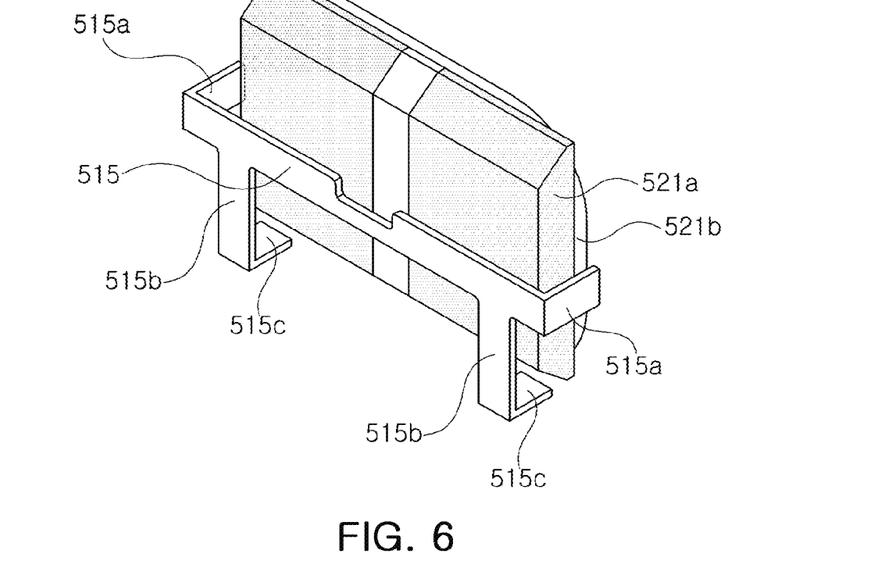
FIG. 6 is a reference view illustrating a positional relationship between a yoke and a driving magnet according to an example.
Figure 7A:
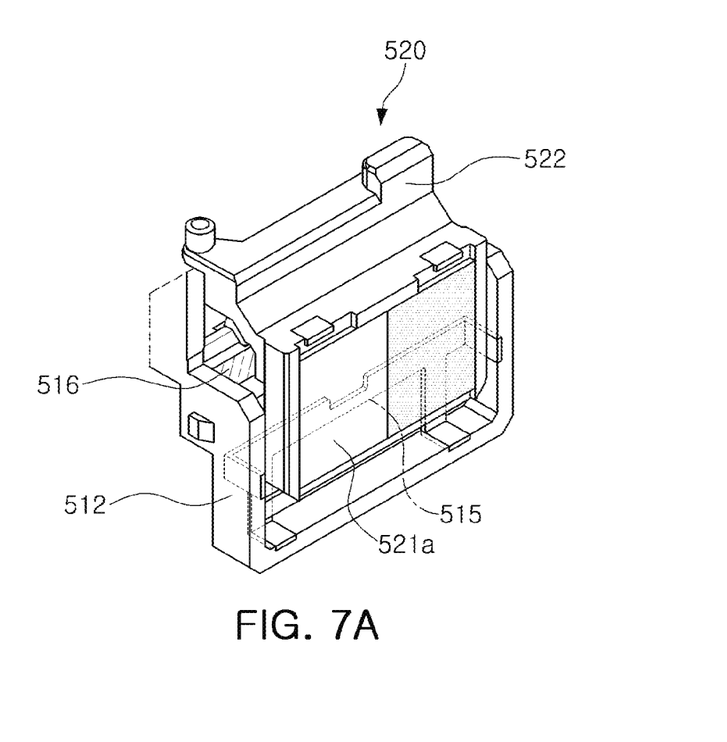
FIGS. 7A, 7B, and 7C illustrate various examples in which a yoke is coupled to a projection.
Figure 7B:
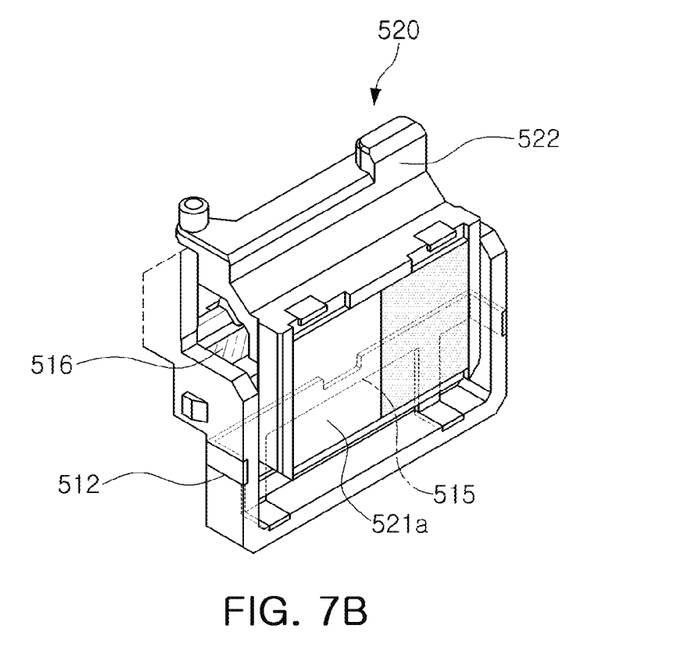
Figure 7C:
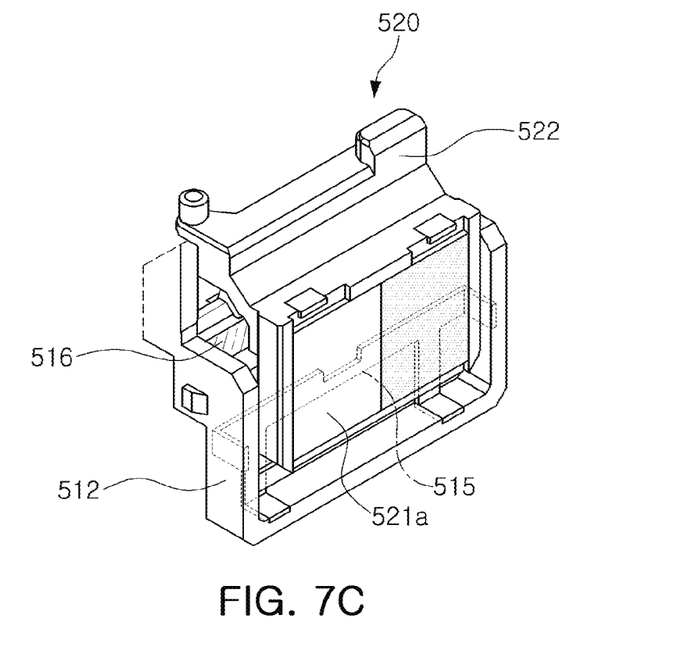

FIG. 4 is an exploded perspective view of an iris module according to an example, and FIGS. 5A and 5B are plan views illustrating that an iris module is driven to change a diameter of an aperture. FIG. 6 is a reference view illustrating a positional relationship between a yoke and a driving magnet according to an example, and FIGS. 7A to 7C illustrate various examples in which a yoke is coupled to a projection according to an example.

An iris module 500 is coupled to the lens module 200 and is configured to selectively change the amount of light incident to the lens module 200.

Since a relatively small amount of light may be incident on the lens module 200 in a high-illuminance environment and relatively large amount of light may be incident on the lens module in a low-illuminance environment, image quality may be constantly maintained in various illuminance conditions.

The iris module 500 is coupled to the lens module 200 to be movable with the lens module 200 in an optical axis direction, a first direction, and a second direction. For example, the lens module 200 and the iris module 500 are configured to be movable together during autofocusing and shake correction. Thus, a distance between the lens module 200 and the iris module 500 does not change.

Referring to FIG. 4, the iris module 500 includes a base 510, a first blade 530, a second blade 540, and an iris driver (including a magnet unit 520 and a coil 521b). The iris module 500 may further include a cover 550 configured to cover the first blade 530 and the second blade 540 and provided with a through-hole 551 through which light is incident.

The first blade 530 is provided with a first through-hole 531, and the second blade 540 is provided with a second through-hole 541. Since the first blade 530 and the second blade 540 are slidably movable in contact with each other, they may be antistatically treated to prevent generation of frictional electricity.

The first blade 530 is provided with a first guide hole 533 and a third guide hole 535, and the second blade 540 is provided with a second guide hole 543 and a fourth guide hole 545.

The first guide hole 533 and the second guide hole 543 may each have a circular shape, and the third guide hole 535 and the fourth guide hole 545 may each have an elongated shape in one direction and may be inclined in one direction. Directions of inclination of the third guide hole 535 and the fourth guide hole 545 may oppose to each other.

The first through-hole 531 and the second through-hole 541 may have shapes in which a plurality of through-holes (531a and 531b) and (541a and 541b) having diameters different from each other are connected to each other. The first through-hole 531 and the second through-hole 541 have shapes in which the through-holes (531a and 541a) having a relatively large diameter and the through-holes (531b and 541b) having a relatively small diameter are connected to each other. As an example, the first through-hole 531 may have an entirely gourd-bottle (or roly-poly) shape and the through-holes 531a, 531b, 541a, and 541b may have a round shape or a polygonal shape.

The first through-hole 531 and the second through-hole 541 may have shapes opposite to each other. For example, the first blade 530 and the second blade 540 rotate about a first projection 513 as a center axis, while the first projection 513 is inserted into both the first guide hole 533 and the second guide hole 543. In consideration of this, the first through-hole 531 and the second through-hole 541 may be provided to be substantially symmetrical in a circumferential direction.

The first blade 530 and the second blade 540 are coupled to the base 510 in such a manner that portions of the first and second blades 530 and 540 overlap each other in the optical axis direction and are configured to be movable by the iris driver. As an example, the first blade 530 and the second blade 540 may be configured to be rotataly movable in opposite directions.

The first and second through-holes 531 and 541 may be configured in such a manner that they partially overlap each other in the optical axis direction. The first and second through-holes 531 and 541 may partially overlap each other in the optical axis direction to form an aperture through which light passes.

The first and second through-holes 531 and 541 may partially overlap each other to form a plurality of apertures having diameters different from each other. As an example, the first and second through-holes 531 and 541 may partially overlap each other to form an aperture having a relatively large diameter and the first and second through-holes 531 and 541 may partially overlap each other to form an aperture having a relatively small diameter (an aperture may have a circular shape or a polygonal shape according to the shape of the first and second through-holes 531 and 541).

Accordingly, light may be incident through one of the plurality of apertures according to a photography environment.

Referring to FIG. 5A, the first blade 530 and the second blade 540 may be rotationally moved about the first projection 513 as an axis by the iris driver, and the first through-hole 531 and the second through-hole 541 may partially overlap to form an aperture having a relatively large diameter.

Referring to FIG. 5B, the first blade 530 and the second blade 540 may be rotationally moved about the first projection 513 as an axis by the iris driver, and the first through-hole 531 and the second through-hole 541 may partially overlap to form an aperture having a relatively small diameter.

Referring to FIGS. 6 to 7C, an iris driver includes a magnet unit 520 disposed on a base 510 to be movable along one axis and a coil 521b fixed to a housing 110 and disposed to oppose the magnet unit 520. The coil 521b is provided on a board 900, and the board 900 is fixed to a housing 110. The board 900 may be electrically connected to a printed circuit board (PCB) attached to a bottom of a camera module 1000.

The magnet unit 520 is a movable member moved with the base 510 in an optical axis direction, a first direction, and a second direction, and the coil 521b is a fixed member fixed to the housing 110.

Since the coil 521b configured to provide driving force to the iris module 500 is disposed outwardly of the iris module 500, for example, in the housing 110 of the camera module 1000, the iris module 500 may decrease in weight.

For example, since the coil 521b, which is configured to provide driving force to the iris module 500, is provided as a fixed member, the coil 521b does not move during autofocusing or hand trembling correction. Thus, an increase in weight of the lens module 200 resulting from employment of the iris module 500 may be significantly reduced.

Since the coil 521b is disposed to the housing 110, which is a fixed member, to be electrically connected to the PCB, there is no influence on the coil 521b of the iris driver during autofocusing and shake correction, even when the lens module 200 and the iris module 500 move.

As a result, an autofocusing function may be prevented from being degraded.

A movement guide unit with the magnet unit 520 disposed thereon is provided on the base 510. The movement guide unit may protrude from the base 510 in the optical axis direction. The movement guide unit may be provided in the form of a square frame in such a manner that the magnet unit 520 is easily seated.

The magnet unit 520 includes a magnet 521a disposed to face the coil 521b and a magnet holder 522 to which the magnet 521a is attached. The magnet 521a is provided to oppose the coil 521b in a direction perpendicular to the optical axis direction.

The magnet unit 520 is coupled to a projection 512 of the base 510. The projection 512 may be provided with a yoke 515 at a position to oppose the magnet 521a. Due to attractive force between the yoke 515 and the magnet 521a, the magnet unit 520 may move slidably while being maintained in close contact with the projection 512.

The magnet unit 520 may move in a direction perpendicular to the optical axis direction. As the magnet unit 520 moves, the first and second blades 530 and 540 may rotate to change a size of an aperture. Accordingly, when the magnet unit 520 moves to one end of the projection 512 in the direction perpendicular to the optical axis direction, the size of the aperture is changed to a large size and a small size. The magnet unit 520 may be maintained in a state of being fixed to one end of the projection 512.

A positional relationship between the yoke 515 and the magnet 521a is established, as shown in FIG. 6. Thus, the magnet unit 520 may be maintained in a state of being fixed to a side end of the projection 512. Additionally, a shape of the yoke 515 may be specifically implemented to allow the magnet unit 520 to readily be closely fixed to both ends of the projection 512.

Referring to FIG. 6, a yoke 515 is provided in such a manner that a center portion has a width greater than a width of both ends. Thus, both ends of the yoke 515 have an area larger than an area of the center portion of the yoke 515. Before driving force is applied to the magnet unit 520, a substantial center of the magnet 521a may be disposed to face a substantial center of the yoke 515. When the coil 521b is supplied with power, the magnet unit 520 is moved to one end or the other end of the projection 512 by interaction with the magnet 521a. In this state, since the magnet unit 520 is closer to one of the ends of the yoke 515, attractive force acting between the magnet unit 520 and one end of the yoke 515 is greater than attractive force acting between the magnet unit 520 and the other end of the projection 512. As a result, the magnet unit 520 may be maintained in a state of being fixed to one end of the projection 512 even when the coil 521b is not supplied with power.

Holding portions 515a each protruding in a direction of the magnet 521a may be respectively provided on both ends of the yoke 515 in such a manner that the magnet unit 520 is easily fixed to one end of the projection 512.

The yoke 515 may be provided to have a height greater than a height of the magnet 521a and may protrude in such a manner that the holding portions 515a face both side surfaces of the magnet 521a, respectively.

To significantly improve performance of the yoke 515, the yoke 515 is provided to cross a middle portion of the magnet 521a (driving magnet) in an optical axis direction and a substantial middle portion of the yoke 515 may have a diameter smaller than a diameter of other portions of the yoke.

The yoke 515 may be provided with first extensions 515b, disposed on both ends of the yoke 515 to protrude in the optical axis direction, respectively. Each first extension 515b may be provided to have a length greater than a length of a lower end of the magnet 521a. A second extension 515c may be provided on an end of each first extension 515b to face a bottom surface of the magnet 521a.

Referring to FIGS. 7A to 7C, the yoke 515 may be provided to have shapes in which the holding portions 515a cover an internal side of both ends of the projection 512 (FIG. 7A), the yoke 515 may be provided to have shapes in which the holding portions 515a cover an external side of both ends of the projection 512 (FIG. 7B), or the yoke 515 may be provided to have shapes in which the holding portions 515a are molded into the projection 512 (FIG. 7C).

A rod member 516 configured to support the magnet unit 520 may be provided on the base 510 in such a manner that the magnet unit 520 is easily slidably movable. An insertion groove 525 may be formed on the magnet unit 520 to insert the rod member 516 into the insertion groove 525.

The rod member 516 may be in the form of a round rod to facilitate sliding movement. To reduce frictional force, the insertion groove 525 is provided in the form of a cylinder having a diameter smaller than a diameter of the rod member 516 to be in linear contact with the rod member 516. Alternatively, although not shown, the insertion groove 525 may be provided in the form of a polygon.

When only the rod member 516 is in contact with the magnet unit 520, fixture of the magnet unit 520 may be unstable, and thus cause tilting. Considering this, a support may be additionally provided on a portion spaced apart from the rod member 516. For example, a guide blade 517 may be provided on an end of the projection 512, and the guide blade may be substantially parallel to the rod member 516.

A first projection 513 is provided on the base 510 to penetrate both the first guide hole 533 of the first blade 530 and the second guide hole 543 of the second blade 540. The first blade 530 and the second blade 540 rotate about the first projection 513 as an axis.

The magnet holder 522 is provided with a second projection 523 disposed to penetrate the first blade 530 and the second blade 540.

The second projection 523 may be configured to penetrate the third guide hole 535 of the first blade 530 and the fourth guide hole 545 of the second blade 540.

The third guide hole 535 and the fourth guide hole 545 may be formed to be inclined lengthwise in a direction in which the magnet unit 520 moves, and directions of inclination of the third guide hole 535 and the fourth guide hole 545 may oppose each other.

Accordingly, the second projection 523 may move within the third guide hole 535 and the fourth guide hole 545 when the magnet unit 520 moves along one axis. As the second projection 523 moves, the first blade 530 and the second blade 540 may move toward the magnet unit 520 or move away from the magnet unit 520 (see FIGS. 5A and 5B).

With the above-described examples, a camera module may selectively change an amount of light incident through an iris module and may prevent an autofocusing function from being degraded even when the iris module is mounted. Moreover, a weight increase caused by employment of the camera module may be significantly reduced.

As described above, even when an iris module is mounted on a camera module, weight increase of a driver may be significantly reduced to prevent autofocusing and handshake correction functions from being degraded.

The examples provide an iris module configured to significantly reduce an increase in weight caused by employment of the iris module and to fix a driver to an accurate position to realize various apertures and a camera module including the iris module.

Furthermore, an iris module according to the examples may accurately realize various apertures, including apertures of various sizes.

A camera module according to the various examples may be provided in a portable electronic device such as a mobile communications terminal, a smartphone, a tablet PC, or the like.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An iris module comprising:
   a base comprising a yoke;
   blades disposed on an object side of the base; and
   a driving magnet configured to be movable in a direction perpendicular to an optical axis direction, and disposed to oppose the yoke, wherein
   the yoke comprises holding portions on both ends of the yoke, and the holding portions protrude in a direction of the driving magnet.

2. The iris module of claim 1, wherein the yoke has a length greater than a length of the driving magnet.

3. The iris module of claim 2, wherein at least a portion of each of the holding portions faces a side surface of the driving magnet.

4. The iris module of claim 1, wherein the yoke crosses a middle portion of the driving magnet in the optical axis direction, and
   a middle portion of the yoke has a diameter smaller than a diameter of the other portions of the yoke.

5. The iris module of claim 1, wherein the yoke crosses a middle portion of the driving magnet in the optical axis direction, and
   the yoke comprises first extensions on both ends of the yoke, and the first extensions protrude in the optical axis direction.

6. The iris module of claim 5, wherein each of the first extensions extends beyond a lower end of the driving magnet, and
   each of the first extensions comprises a second extension disposed on an end of the first extension, and the second extensions protrude to face a bottom surface of the driving magnet.

7. The iris module of claim 1, wherein the base comprises a projection extending in the optical axis direction.

8. The iris module of claim 7, wherein the magnet is moveably provided on the projection.

9. The iris module of claim 7, wherein the holding portions are molded into the projection.

10. The iris module of claim 7, wherein the holding portions are exposed outwardly of the projection in the direction perpendicular to the optical axis direction.

11. The iris module of claim 1, wherein the base is coupled to an object side of a lens module.

12. A camera module comprising:
    a lens module;
    a housing configured to accommodate the lens module; and
    an iris module coupled to an object side of the lens module,
    wherein the iris module comprises:
        a base fixed to an object side portion of the lens module, the base extending outwardly of the lens module in an optical axis direction;
        blades disposed on the object side of the lens module and configured to form one or more apertures to change an intensity of light incident on the lens module;
        a magnet unit comprising a driving magnet, the magnet unit being movable in a direction perpendicular to the optical axis direction; and
        a projection comprising a yoke disposed to oppose the driving magnet,
    the yoke comprises holding portions on both ends of the yoke, and the holding portions extend in a direction of the driving magnet, and
    the housing comprises a coil configured to react with the magnet to drive the iris module.

13. The camera module of claim 12, wherein the magnet unit comprises a projection configured to penetrate a guide hole in each of the blades.

14. The camera module of claim 12, wherein the base comprises a projection configured to be inserted into a guide hole in each of the blades, and the blades are configured to form the one or more apertures by rotationally moving about the projection as an axis.

15. The camera module of claim 12, wherein the base comprises a rod member, the magnet unit comprises an insertion groove, and the rod member is configured to be inserted into the insertion groove to move the magnet unit in the direction perpendicular to the optical axis direction.

16. The camera module of claim 12, wherein the blades comprise a first blade and a second blade that at least partially overlaps the first blade in the optical axis direction, the first blade comprises a first through hole, the second blade comprises a second through hole, and the first blade and the second blade are configured to rotate in opposite directions about a common axis to form the one or more apertures.

* * * * *